United States Patent [19]
Campbell et al.

[11] Patent Number: 4,734,009
[45] Date of Patent: Mar. 29, 1988

[54] METHOD AND APPARATUS FOR ALIGNING TURBINE ROTORS

[75] Inventors: Ira J. Campbell, East Bradford; Philip W. Ketterer, Norristown, both of Pa.

[73] Assignee: Westinghouse Electric Corp., Pittsburgh, Pa.

[21] Appl. No.: 31,801

[22] Filed: Mar. 30, 1987

[51] Int. Cl.4 .............................. F04D 29/20
[52] U.S. Cl. .................. 415/170 R; 384/273; 384/312; 29/526 R; 29/156.8 R; 29/464
[58] Field of Search ............... 415/170 R, 171, 174, 415/DIG. 3; 384/273, 312; 29/526 R, 156.8 R, 464

[56] References Cited

U.S. PATENT DOCUMENTS

| | | | |
|---|---|---|---|
| 1,949,114 | 2/1934 | Darrach | 384/626 |
| 3,472,566 | 10/1969 | Kunderman | 384/312 |
| 4,346,969 | 6/1982 | Kahlert et al. | 384/626 |
| 4,633,810 | 1/1987 | Martin | 29/464 |
| 4,644,640 | 2/1987 | Muller | 29/464 |

FOREIGN PATENT DOCUMENTS 207521 12/1983 Japan .................. 384/312

Primary Examiner—Robert E. Garrett
Assistant Examiner—John T. Kwon

[57] ABSTRACT

An improved method and apparatus for changing alignment shims used in conventional three-key bearing support systems for steam turbine rotors is provided by coupling the two lower bearing support pads together to maintain their fixed relationship relative to the spherical bore within which they are mounted.

9 Claims, 5 Drawing Figures

METHOD AND APPARATUS FOR ALIGNING TURBINE ROTORS

BACKGROUND OF THE INVENTION

This invention is related generally to steam turbines, and more particularly to a method and apparatus for aligning the rotor of such steam turbines, wherein the rotor is supported at its ends by a pair of journal bearings.

Large steam turbines, such as the BB73 model manufactured by Westinghouse Electric Corporation, typically include a rotor and a pair of journal bearings supporting the rotor at its ends, each of the journal bearings having an upper half and a lower half adapted to be joined together forming a bearing shell which is mounted within a spherical bore of a bearing pedestal. Since the rotors of such turbines must of necessity operate in an aligned condition, various means have been provided in the past to support the journal bearings within their respective spherical bores. One prior art approach which provides such support is commonly referred to in the art as a three-key bearing support system.

In the widely-used three-key bearing support system, the upper half of each journal bearing includes a first keyway, formed longitudinally therein with respect to the rotor to contain a bearing support pad or key having an outer male spherical surface adapted to conform to the spherical bore. Second and third keyways are formed longitudinally in the lower half of the journal bearing to respectively contain second and third bearing support pads or keys. Such second and third keyways are often spaced radially 90° from one another substantially equidistant from a plane which bisects the lower half radially. Like the first bearing support pad or key, the second and third bearing support pads or keys include an outer male spherical surface which is adapted to substantially conform to the spherical bores.

Each of the three bearing support pads or keys, prior to bearing assembly, have in the past been rigidly attached within their respective keyways. Typically, such rigid attachment is provided by threadedly coupling the bearing support pads or keys to their respective keyways. In order to align the rotor, however, alignment shims or liners are first inserted as necessary between the bearing support pad or key requiring adjustment in its keyway. Thereafter, the outer male spherical surface of each bearing support pad or key is hand worked by filing or scraping the surface to provide a predetermined percentage of contact between the surface and the spherical bore of the bearing pedestal. Since the bearing support pad or key which is installed in the upper half of each journal bearing is substantially free of the weight of the rotor, the fit of the bearing support pad or key in the upper half of the journal bearing is not critical and, more often than not, a 10% contact between the bearing support pad or key installed in the upper half of the journal bearing and the spherical bore is suitable. On the other hand, at least 75% contact is often required for the bearing support pads or keys installed in the lower half of the journal bearing. It can be readily appreciated, therefore, that changes of alignment shims or liners will necessitate reworking of the outer male spherical surfaces of the bearing support pads or keys installed in the lower half of the journal bearings in order to maintain the at least 75% contact.

Such changes of alignment shims or liners may be required to align the rotor when changing conditions such as the settling of the turbine's foundation, wear on adjacent bearings, or distortion in the turbine as a whole, cause the turbine rotor to become misaligned. Alignment of the rotor must also be checked, with changes to the alignment shims or liners made as necessary, when the rotor has been removed from the turbine for maintenance. Because the bearing support pads or keys in prior art approaches have been rigidly attached to the journal bearing, changes increasing or decreasing the thickness of the alignment shims or liners create radii which are greater or less than the radii before the change. That is, the true radius from the center of a rotor to the outer male spherical surface of a bearing support pad or key is increased or decreased when alignment shims or liners are added or removed. These added or removed alignment shims or liners cause a change of position of the bearing support pad or key within its keyway such that changes in the percentage of contact between the outer male spherical surface of the bearing support pad or key and the spherical bore result. Therefore, changes of alignment shims or liners often require repeated hand working of the outer male spherical surfaces of the bearing support pads or keys, especially those installed in the lower half of the journal bearing to maintain at least 75% contact. Such repeated hand working in large steam turbines may often consume hours or days of effort.

SUMMARY OF THE INVENTION

Accordingly, it is a general object of the present invention to provide a method and apparatus for aligning a turbine rotor. More specifically, it is an object of the present invention to provide a method and apparatus for aligning a turbine rotor by facilitating the changing of alignment shims or liners.

Another object of the present invention is to provide a method and apparatus for aligning a turbine rotor which reduces the periods of down-time required for such alignment.

Still another object of the present invention is to provide a method and apparatus for aligning a turbine rotor which substantially eliminates the necessity of repeated hand working of the outer male spherical surfaces of the bearing support pads or keys installed in the lower half of the journal bearing supporting the rotor.

Briefly, these and other objects are accomplished by apparatus for aligning a turbine rotor supported at its ends by a pair of journal bearings, each of the bearings including an upper half and a lower half adapted to be joined together forming a bearing shell which is mounted within a spherical bore of a bearing pedestal, wherein the apparatus generally comprises first means, rigidly attached to the upper half of each journal bearing, for supporting the bearing within its associated spherical bore, and second bearing support means adjustably attached to the lower half of each journal bearing. The second bearing support means, in accordance with the present invention, includes a pair of bearing support pads each of which have a male spherical surface adapted to conform to the spherical bore to a predetermined percentage of contact therebetween, and means for coupling the pair of pads in a fixed relationship relative to the spherical bore, the coupling means being attached to the bearing shell.

In accordance with one important aspect of the invention, the coupling means comprise a pair of keyways formed longitudinally in the lower half of the journal bearing, each of which extend radially inward to a reference surface, the respective reference surfaces of the pair of keyways being arranged substantially perpendicular to one another and spaced equidistantly from a plane substantially bisecting the lower half radially, and a pair of side plates coupling the pads within their respective keyway. Unlike prior art approaches which rigidly attached the bearing support pads or keys within respective keyways, the apparatus according to the present invention permits the pair of bearing support pads or keys installed within the keyways formed in the lower half of the journal bearing to maintain their position relative to the spherical bore when changes of alignment shims or liners are necessitated.

In accordance with another important aspect of the invention, an improved method of changing the alignment shims or liners in a typical three-key bearing support system of a steam turbine having a rotor and a pair of journal bearings, each journal bearing including an outer end face, and upper half adapted for support by one of the keys and a lower half adapted for support by the other two keys, wherein the upper half and the lower half of each journal bearing is joined together for mounting within a spherical bore of a bearing pedestal having a horizontal joint, is provided through utilization of apparatus as described herein above. By coupling the pair of keys supporting each lower half of the journal bearings between the pair of plates attached to the sides of each journal bearing, the fixed relationship existing between the keys relative to their respective spherical bore is maintained. The rotor may then be raised to remove its weight from the pair of keys supporting each lower half of the journal bearings after a reference position for the bearings is established. Thereafter, the side plate proximate to the outer end face of each journal bearing is removed, thereby exposing the alignment shims or liners for ready replacement. Since the side plate opposite the removed side plate will maintain the fixed relationship of the keys relative to their respective spherical bore, new shims may be inserted conveniently between the keys and their associated keyways, the removed side plates replaced, and the rotor lowered for support within the spherical bores by the pair of keys associated with the lower half of each journal bearing.

The above and other objects, advantages, and novel features of the present invention will become more apparent from the following detailed description of a preferred embodiment when considered in conjunction with the accompanying drawings wherein:

DETAILED DESCRIPTION OF THE PREFERRED EMBODIMENT

Figure 1:
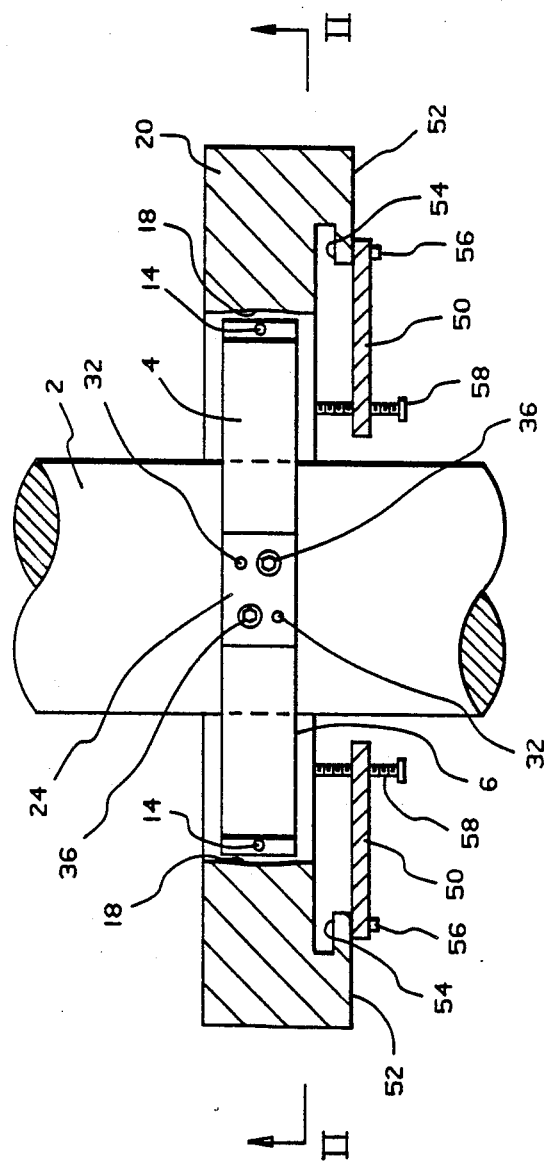
FIG. 1 illustrates in plan view, partly cut away, one end of a turbine rotor supported by a journal bearing mounted within a spherical bore of a bearing pedestal.
Figure 2:
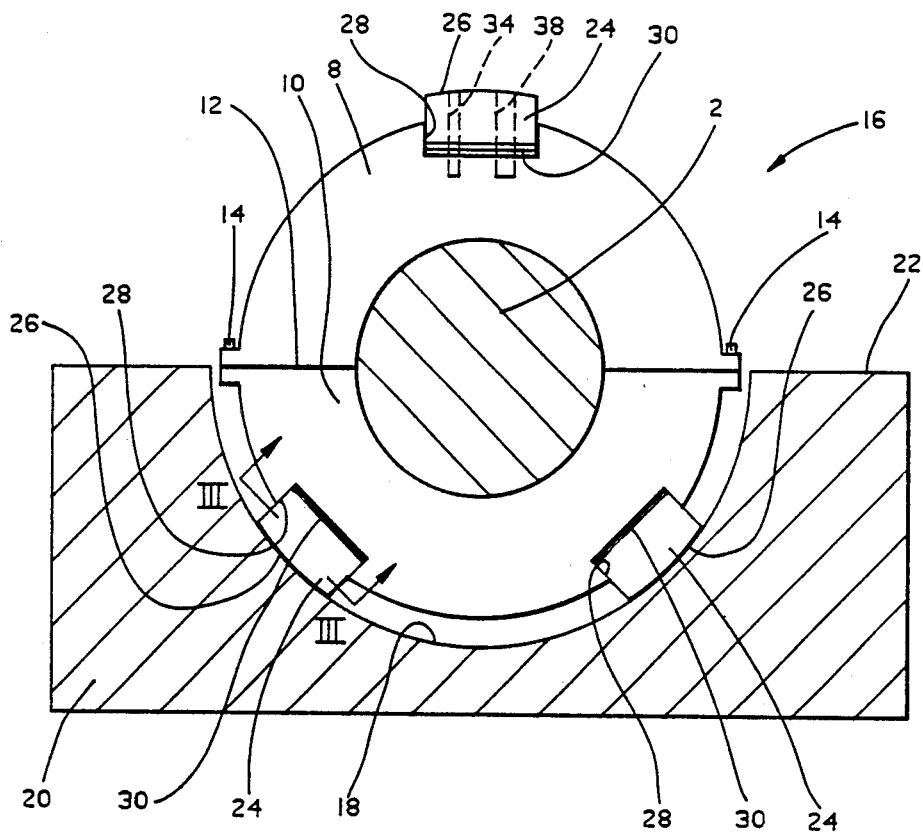
FIG. 2 shows in sectional view the apparatus of FIG. 1 taken along the lines II—II.
Figure 3:
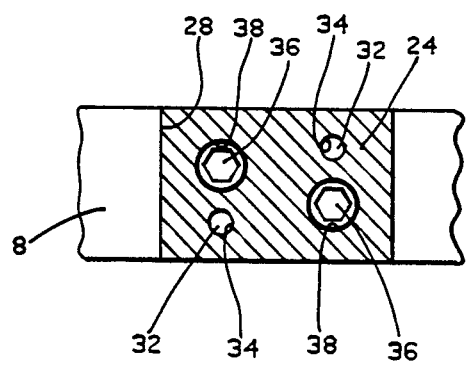
FIG. 3 illustrates in greater detail the means by which a conventional bearing support pad or key is contained within its respective keyway.

Referring now to the drawings, wherein like characters designate like or corresponding parts throughout the several views, a typical three-key bearing support system of a conventional steam turbine having a rotor 2 supported at each end by a journal bearing 4 is shown in FIGS. 1–3. Each journal bearing 4 includes an outer end face 6, an upper half 8 and a lower half 10 having an upper horizontal surface 12. The upper half 8 and lower half 10 of each journal bearing 4 are adapted to be joined together by any suitable attachment means 14 thereby forming a bearing shell 16 which is mounted within a spherical bore 18 of a bearing pedestal 20. The bearing pedestal 20 also includes an upper and lower half separated by a horizontal joint 22, but for purposes of clarity FIGS. 1 and 2 show only the lower half of the bearing pedestal 20.

As conventionally employed in a steam turbine, the three-key bearing support system is comprised generally of three bearing support pads or keys 24, each of which include an outer male spherical surface 26 adapted to conform to the spherical bore 18 of the bearing pedestal 20. The bearing support pads or keys 24 are rigidly attached to the journal bearing 4 within respective keyways 28, typically one keyway 28 being formed in the upper half 8 of the journal bearing 4 and two keyways 28 being formed in the lower half 10 of the journal bearing 4. A plurality of alignment shims or liners 30 are inserted between the bearing support pads or keys 24 and their respective keyways 28 as necessary to align the rotor 2. As shown more clearly in FIG. 3, the bearing support pads or keys 24 and their associated alignment shims or liners 30 (not shown) are typically rigidly attached to the keyways 28 by a pair of dowels 32 inserted within registry bores 34 and socket head screws 36 coupled within threaded bores 38. The alignment shims 30 may be typically comprised of thin metal plates on the order of several thousandths of an inch thick, while thicker metal plates are referred to in the art as "liners".

As will be readily appreciated from the foregoing, a change of alignment shims or liners 30 necessitated by changing conditions such as foundation settling, wear on adjacent bearings, or distortion in the turbine as a whole, would require lengthy maintenance procedures with prior art three-key bearing support systems. For example, with the weight of the rotor 2 being externally supported, the journal bearing 4 would first have to be rolled on the rotor 2 until the two bearing support pads or keys 24 attached to the lower half 10 of the journal bearing 4 were on top in order to make a change of alignment shims or liners 30. The socket head screws 36 would then be removed in order to remove the old alignment shims or liners 30, with new alignment shims or liners 30 being installed thereafter as necessary to realign the rotor 2. After the liner change, and because the bearing support pad or key 24 would now be on a slightly different radius, the contact area of the bearing support pad or key 24 would be checked and hand worked by filing or scraping until at least 75% contact between the outer male spherical surface 26 of the bearing support pad or key 24 and the spherical bore 18 of the bearing pedestal 20 was achieved. Such hand working often requires additional liner changes, and the process would be repeated until the required position was obtained with the necessary contact.

Figure 4:
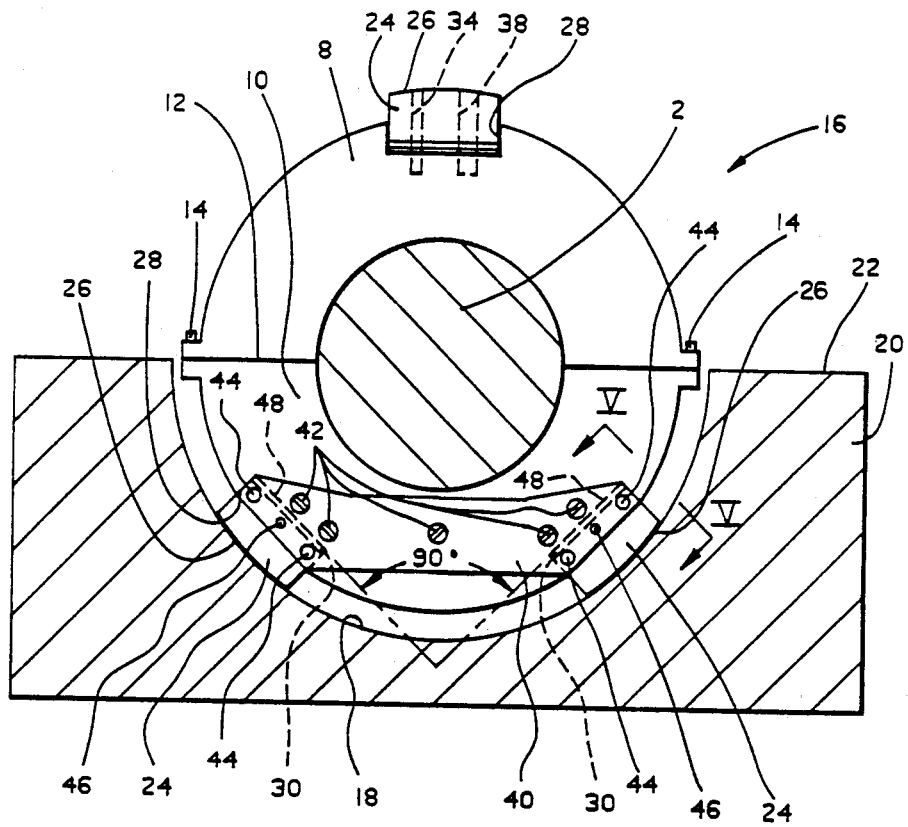
FIG. 4 shows a preferred embodiment of the present invention.
Figure 5:
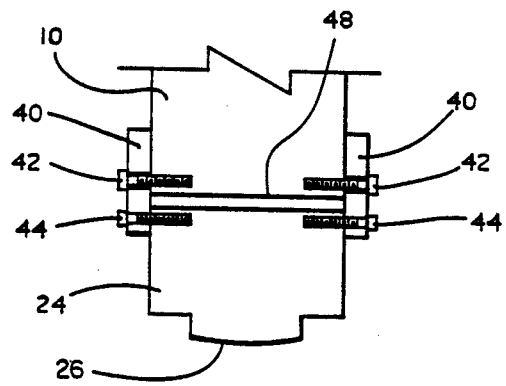
FIG. 5 illustrates in side view the apparatus shown in FIG. 4 taken along the lines V—V.

Instead of independently adjusting and rigidly attaching the bearing support pads or keys 24 to the lower half 10 of the journal bearing 4, an improved method and apparatus for changing alignment shims or liners 30 in a three-key bearing support system of a steam turbine includes modifications to the prior art approach as will be described now with reference to FIGS. 4 and 5. Like the prior art three-key bearing support systems, the bearing support pad or key 24 inserted within the keyway 28 formed in the upper half 8 of the journal bearing 4 is rigidly attached in a manner similar to that shown in FIG. 3. However, the two bearing support pads or keys 24 of the lower half 10 are coupled together in a fixed relationship relative to the spherical bore 18 within their respective keyways 28. The journal bearing 4, bearing support pads or keys 24, and keyways 28 are similar in all respects to the prior art approaches, but the means for coupling the two bearing support pads or keys 24 in the lower half 10 of the journal bearing 4 as will be described in further detail herein below permits a rapid change of alignment shims or liners 30 without the repeated hand working required to maintain the desired contact between the outer male spherical surfaces 26 of the bearing support pads or keys 24 and the spherical bore 18 of the bearing pedestal 20.

When initially installed, the two bearing support pads or keys 24 inserted within their respective keyways 28 of the lower half 10 of the journal bearing 4 are hand worked to achieve at least 75% contact. Thereafter, a pair of side plates 40 are attached respectively to either side of the journal bearing 4 by means such as machine screws 42. The bearing support pads or keys 24 are also coupled to the side plates 40 by cap screws 44 or other suitable such means and a dowel 46. Unlike prior art approaches which rigidly attached the two bearing support pads or keys 24 in the lower half 10 of the journal bearing 4, the bearing support pads or keys 24 shown in FIGS. 4 and 5 as coupled to the side plates 40 are permitted to "float" within the keyways 28 such that changes to the alignment shims or liners 30 placed between the bearing support pads or keys 24 and the keyways 28 do not cause a change in the true radius of the associated outer male spherical surfaces 26 of the bearing support pads or keys 24. Instead, when additions or deletions of alignment shims or liners 30 are made with the improved bearing support system according to the present invention, the inner surfaces of the keyways 28 provide a pair of reference surfaces 48 separated by 90° thereby comprising a generally V-shaped alignment surface from which flat-on-flat adjustments may be made to align the rotor.

Once aligned, however, the rotor 2 may become misaligned due to foundations settling, wear on adjacent bearings, or distortion in the turbine as a whole. As a result, a change of alignment shims or liners 30 is required. In steam turbines employing the three-key bearing support system according to the present invention, the two bearing supports pads or keys 24 in the lower half 10 of the journal bearing 4 have already fixed their relationship with respect to the spherical bore 18 in order to maintain at least 75% contact. Therefore, a pair of reference planes are subsequently established before making the liner changes.

Referring again to FIGS. 1 and 2, a first reference plane arranged vertically perpendicular to the aligned bearing axis is conventionally provided by attaching a plurality of locating plates 50 to a vertical face 52 arranged proximate to a reference bore 54 in close juxtaposition to each journal bearing 4. In typical steam turbines, such as the BB73 model manufactured by Westinghouse Electric Corporation, the vertical face 52 is provided by the vertical face of the outer oil ring setting bore comprising the reference bore 54. As shown in FIG. 1, the locating plates 50 may be attached by any suitable means such as a bolt 56. Each locating plate 50 is also provided with a jack screw 58 which is adjusted inwardly towards the journal bearing 4 to contact its outer end face 6. The jack screws 58 are thereafter locked in their adjusted position.

In order to provide the second reference plane, arranged horizontally perpendicular to the first reference plane, the upper half 8 of each journal bearing 4 is typically removed after establishment of the first reference plane. The position of the lower half 10 of each journal bearing 4 is then adjusted within its respective spherical bore 18 to parallel its upper horizontal surface 12 with the associated horizontal joint 22 of the bearing pedestal 20. The upper half 8 of each journal bearing 4 may thereafter be joined with its level lower half 10.

Once both reference planes are established, the rotor 2 may be externally supported and the journal bearing 4 raised slightly to remove its weight from the bearing support pads or keys 24 installed in the lower half 10 of each journal bearing 4. Liner changes are thereafter accomplished by removing the side plate 40 proximate to the outer end face 6 of each journal bearing 4, removing the old alignment shims or liners 30, inserting new alignment shims or liners 30 to a predetermined thickness suitable for realignment of the rotor 2, and then replacing the side plate 40. Since the opposite side plate 40 maintains the fixed relationship of the two bearing support pads or keys 24 relative to the spherical bore 18, repeated working of the outer male spherical surfaces 26 of those two bearing support pads or keys 24 is obviated, thereby facilitating maintenance during rotor alignment and reducing the periods of down-time during a unit outage.

Although particular embodiments of the invention have been shown and described and various modifications suggested, it will be appreciated that other embodiments and modifications which fall within the true spirit and scope of the invention as set forth in the appended claims will occur to those of ordinary skill in the art.

We claim as our invention:

1. Apparatus for aligning a turbine rotor centrally within a reference bore, each end of the rotor being supported by a respective journal bearing including an upper half and a lower half joined together by a bearing shell for mounting within a spherical bore of a bearing pedestal, comprising:

first bearing support means, rigidly attached to the upper half of each journal bearing, for supporting the bearing within its associated spherical bore; and
   second bearing support means adjustably attached to the lower half of each journal bearing, said second bearing support means including a pair of bearing support pads each of which have a male spherical surface adapted to conform to the spherical bore to a first predetermined percentage of contact therebetween, and means for coupling said pair of pads in a fixed relationship relative to the spherical bore, said coupling means being attached to the bearing shell.

2. The apparatus according to claim 1, wherein said first bearing support means comprises:

a first keyway, formed longitudinally in the upper half of the journal bearing substantially bisecting the upper half radially;

a third bearing support pad having an outer male spherical surface adapted to conform to the spherical bore to a second predetermined percentage of contact therebetween and an inner surface adapted for insertion within said first keyway; and means for attaching said third pad to the upper half of the journal bearing within said first keyway.

3. The apparatus according to claim 2, wherein said first bearing support means further comprises a preselected plurality of shims attached to the upper half of the journal bearing between said third pad and said first keyway.

4. The apparatus according to claim 2, wherein said attaching means comprises;

a pair of registry bores formed radially in said first keyway;

a pair of threaded bores formed radially in said first keyway; and a pair of socket head screws adapted to be threadedly coupled to said threaded bores thereby rigidly attaching said third pad to the upper half of the journal bearing within said first keyway.

5. The apparatus according to claim 2, wherein said second predetermined percentage comprises at least ten percent.

6. The apparatus according to claim 1, wherein said coupling means comprises:

second and third keyways formed longitudinally in the lower half of the journal bearing, each of which extend radially inward to a reference surface, the respective reference surfaces of said second and third keyways being arranged substantially perpendicular to one another and spaced equidistantly from a plane substantially bisecting the lower half radially; and a pair of side plates coupling said pair of pads respectively within said second and third keyways.

7. The apparatus according to claim 6, wherein said second bearing support means further comprises a preselected plurality of shims adapted for insertion between said pair of pads and their respective reference surfaces.

8. The apparatus according to claim 1, wherein said first predetermined percentage comprises at least seventy-five percent.

9. A steam turbine, comprising:

stator means, including a plurality of stationary blades disposed radially about a central bore, for directing a flow of steam through said central bore;

rotor means, including a shaft having a plurality of rotating blades mounted thereon, for generating rotary mechanical power from the energy in said steam flow;

a pair of journal bearings, each including an upper half and a lower half joined together by a bearing shell for mounting within a spherical bore of a bearing pedestal, said journal bearings supporting said shaft at its ends for rotation within said central bore; and means for aligning said rotor means by supporting said journal bearings centrally within said spherical bores, said aligning means comprising a pair of bearing support pads adjustably attached to the lower half of each journal bearing, each said pad including an outer male spherical surface adapted to conform to said spherical bore to a predetermined percentage of contact therebetween, means for coupling said pair of pads in a fixed relationship relative to said spherical bore, said coupling means being attached to said bearing shell a keyway formed longitudinally in said upper half of each journal bearing substantially bisecting said upper half radially, a third bearing support pad having an inner surface adapted for insertion within said keyway and an outer male spherical, surface adapted to conform to said spherical bore, and means for rigidly attaching said third pad to said upper half.

* * * * *